Jan. 16, 1962 H. B. DRAPEAU 3,017,113
COMBINATION TEMPERATURE AND PRESSURE SENSITIVE VALVE STRUCTURE
Filed Jan. 30, 1956 2 Sheets-Sheet 1

Inventor
HAROLD B. DRAPEAU

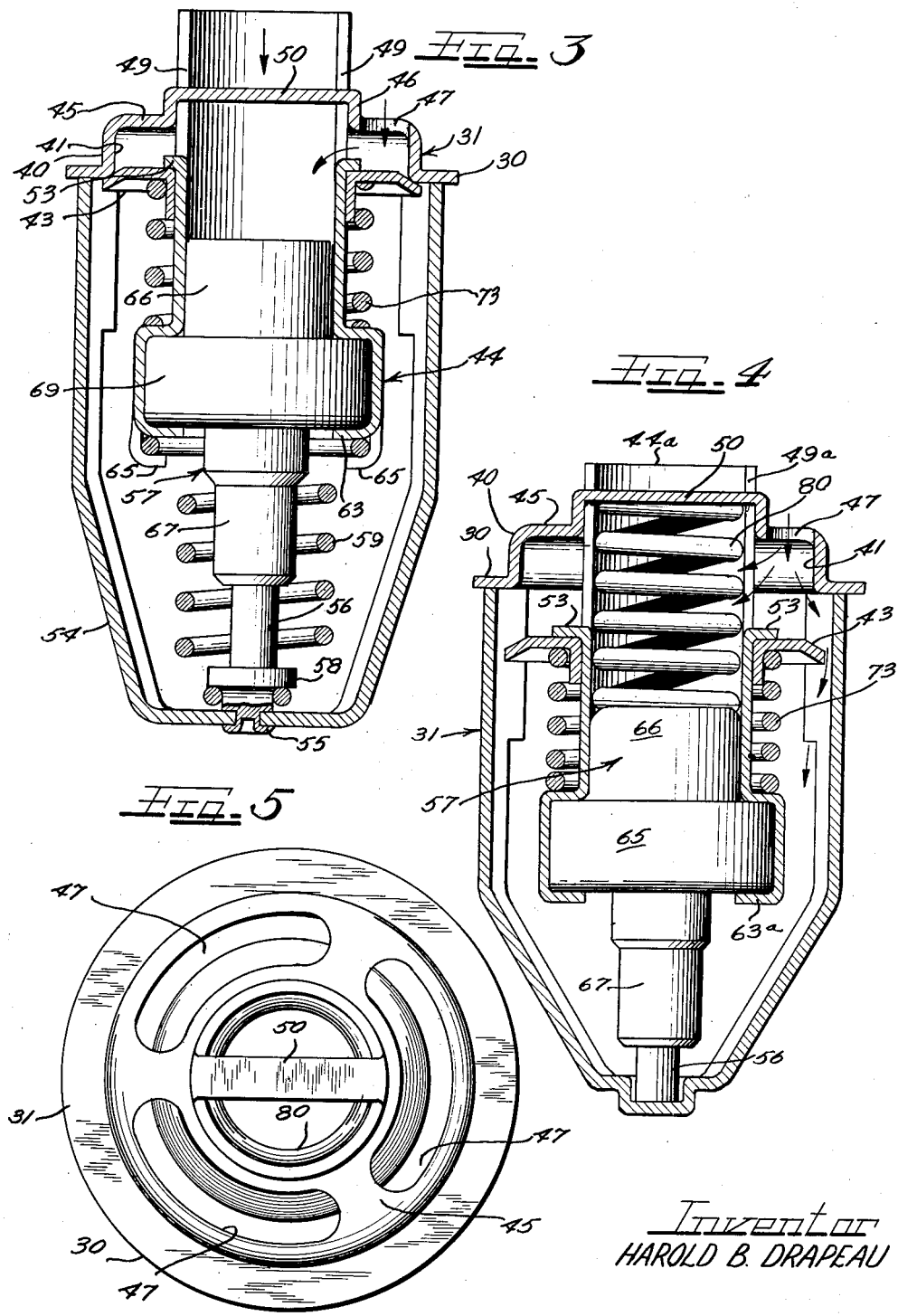

United States Patent Office 3,017,113
Patented Jan. 16, 1962

3,017,113
COMBINATION TEMPERATURE AND PRESSURE SENSITIVE VALVE STRUCTURE
Harold B. Drapeau, Oak Park, Ill., assignor to The Dole Valve Company, Chicago, Ill., a corporation of Illinois
Filed Jan. 30, 1956, Ser. No. 562,277
1 Claim. (Cl. 236—34)

This invention relates to improvements in temperature controlled valves.

A principal object of the invention is to provide a simple and effective valve particularly suitable for use as a control means for controlling operation of the cooling fan of an internal combustion engine in accordance with the temperature of the coolant therefor.

Another object of the invention is to provide an improved valve for controlling fluid flow through a conduit wherein the valve includes a casing having a flow port therethrough with a valve seat facing in a downstream direction, an annular valve member cooperable with said seat to control fluid flow through the port, a movable guide extending axially within the valve member and having an abutment limiting movement of the valve member on the guide in a direction toward the seat, a spring on the guide biasing the valve member against the abutment and yielding with a predetermined pressure differential across the valve member to permit movement away from the valve seat, and a thermal sensing power means having a temperature sensitive portion exposed to the temperature of fluid prior to passing through said port, with the power means connected to the movable guide for moving the guide and the annular valve member relative to the port and to the valve seat to control fluid flow therethrough as a function of the temperature of the temperature sensitive portion, the guide being in the form of a tube open at its upstream end and closed at its downstream end by the thermal element thus affording communication between the upstream side of the valve seat and the temperature sensitive portion of the power means so that the temperature sensitive portion is exposed to the temperature of the fluid prior to passing through the port.

These and other objects of the invention will appear from time to time as the following specification proceeds and with reference to the accompanying drawings wherein:

FIGURE 3 is a view like FIGURE 1 but showing the valve in its closed position;

FIGURE 4 is a sectional view taken through a modified form of valve constructed in accordance wth my invention; and FIGURE 5 is a top end view of the valve shown in FIGURE 4.

Figure 1:
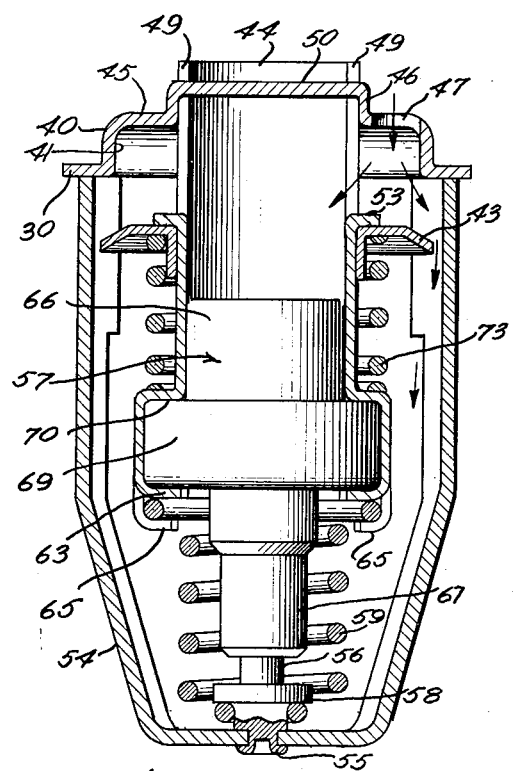
FIGURE 1 is a transverse sectional view taken through a control valve, showing the valve in its open position.

A valve 31 includes an annular valve casing 40 having the flange 30 extending therefrom and having a wall 41 extending perpendicular to the flange 30. The inner margin of the junction between the wall 41 and the flange 30 defines a seat for a valve 43 carried on a slidable guide member 44.

The casing 40 has an outer wall 45 at right angles to the wall 41 terminating into a cylindrical wall 46 within which the guide member 44 is slidably guided. The wall 45 has ports 47 leading therethrough, for the passage of fluid such as coolant through the casing 40 when the valve is opened. Normal flow will be in the downward direction as viewed in FIGURE 1.

The guide 44 is generally cylindrical in form and is slidably guided within the cylindrical wall 46 of the valve casing 40 and has diametrically opposed slotted portions 49 extending along opposite sides of a strap 50 extending across the end of the cylindrical wall 46 and formed integrally therewith, it being understood that the casing 40 and guide 44 are preferably made from stampings.

The portions of the guide 44 forming the slots 49 may be formed by a shearing operation and a part of the portions sheared from the guide may be bent outwardly to form lugs 53, forming a stop for the valve 43.

Secured to the flange 30 of the valve casing 40 and extending from said flange and valve casing in a downstream direction is a stirrup 54 having a seating stud 55 riveted thereto at the end thereof, in axial alignment with the center of the valve casing 40 and forming a seat for a power member or piston 56 of a thermal element 57. The seating stud 55 is shown as having a flange 58 at its inner end portion, the outer side of which flange is abutted by the coil of a tension spring 59 connected at its opposite end to an inwardly extending flanged portion 63 of the guide member 44, by lugs 65 extending over the inner end coil of said spring and formed integrally with the guide member 44.

The thermal element 57 may be power type of thermal element, such as is shown in the Vernet Patent No. 2,368,181 and includes a casing 66 extending within the guide 44 and a heat conducting ring 69 abutting a shouldered portion 70 of the guide 44 and retained to said guide by the flange 63.

In such types of thermal elements, the thermal medium in the form of a fusible material is contained within the casing 66 and reacts against a membrane or deformable member (not shown), to extend the power member or piston 56 from a cylinder 67 of the thermal element as the temperature of the thermal medium reaches its fusion point. The thermal medium may be a wax alone or a wax containing a powdered metal heat conductor and a binder, the material used being selected for its melting or fusion point, and the fusion point thereof determining the temperature range of operation of the thermal element.

The valve 43 is shown as being biased into engagement with the lugs 53 by a compression spring 73 interposed between the outside of the shouldered portion 70 and the valve 43. The spring 73 serves not only as an over travel spring but also serves as a pressure relief spring to accommodate the valve 43 to move to an open position against the spring 73 due to pressure of fluid above the valve.

The valve 43 thus serves not only as a thermostatic valve but also serves as a pressure relief valve.

Figure 2:
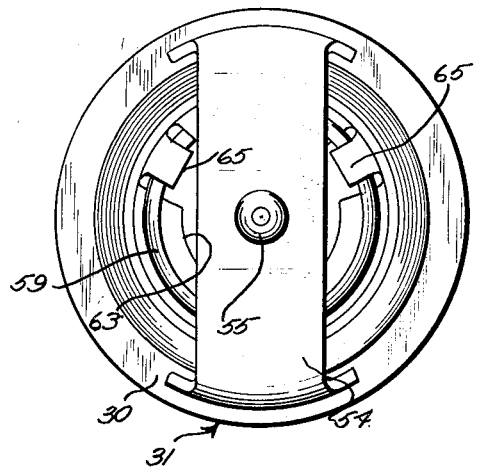
FIGURE 2 is a bottom end view of the valve.

In the modification of my invention shown in FIGURES 4 and 5, I have shown a valve similar to that shown in FIGURES 1 through 3, except that the biasing spring for the valve and return spring for the thermal element is a compression rather than a tension spring. In this form of the invention, the valve casing, stirrup and thermal element are similar to those in the form of my invention illustrated in FIGURES 1, 2 and 3 so like part numbers will be applied to FIGURES 4 and 5 as were applied to similar parts in FIGURES 1, 2 and 3.

The thermal element 57 is carried in a guide 44a similar to the guide 44 except that the lugs 65 maintaining the tension spring to the guide have been eliminated, as has the tension spring.

A compression spring 80 is shown as being seated between the inside of the strap 50 of the valve casing 40 and the bottom of the thermal element 57, to bias the power member or piston 56 of the thermal element in a retracted position.

The valve otherwise is like the valve of FIGURES 1, 2 and 3 so the description thereof need not be repeated herein. It should be noted, however, that the spring 73 biases the valve 43 into engagement with the lugs or ears 53 and also may be so loaded as to serve as a release spring, accommodating opening of the valve in a predetermined pressure range.

It will be understood that modifications and variations of the present invention may be effected without departing from the spirit and scope of the novel concepts thereof.

I claim as my invention:

A valve for controlling fluid flow through a conduit comprising a casing having a flow port therethrough with a valve seat facing in a downstream direction, an annular valve member cooperable with said seat to control fluid flow through the port, a movable guide extending axially within said valve member and having an abutment limiting movement of the valve member on the guide in a direction toward said seat, a spring on said guide biasing the valve member against said abutment and yieldng with a predetermined pressure differential across the valve member to permit movement away from the valve seat, and thermal sensing power means having a temperature sensitive portion exposed to the temperature of fluid prior to passing through said port, said power means connected to said movable guide for moving the guide and the annular valve member relative to said port and to said valve seat to control fluid flow therethrough as a function of the temperature of said temperature sensitive porton, said guide being a tube open at its upstream end and closed at its downstream end by the thermal element thus affording communication between the upstream side of the valve seat and the temperature sensitive portion of said power means so that said temperature sensitive portion is exposed to the temperature of fluid prior to passing through said port.

References Cited in the file of this patent
UNITED STATES PATENTS

| | | |
|---|---|---|
| 1,752,116 | Smith | Mar. 25, 1930 |
| 2,022,709 | Embery et al. | Dec. 3, 1935 |
| 2,356,958 | Von Wangenheim | Aug. 29, 1944 |
| 2,469,195 | Eshbaugh | May 3, 1949 |
| 2,501,185 | Moorhead | Mar. 21, 1950 |
| 2,510,473 | Jensen | June 6, 1950 |
| 2,516,390 | Jensen | July 25, 1950 |
| 2,611,347 | Nallinger | Sept. 23, 1952 |
| 2,797,873 | Woods | July 2, 1957 |